(12) United States Patent
Lowe et al.

(10) Patent No.: US 11,162,556 B2
(45) Date of Patent: Nov. 2, 2021

(54) NON-UNIFORM TRUSS HYBRID MATERIAL SYSTEM

(71) Applicant: Colorado School of Mines, Golden, CO (US)

(72) Inventors: Terry C. Lowe, Golden, CO (US); Kady M. Zinke, Denver, CO (US)

(*) Notice: Subject to any disclaimer, the term of this patent is extended or adjusted under 35 U.S.C. 154(b) by 152 days.

(21) Appl. No.: 15/796,273

(22) Filed: Oct. 27, 2017

(65) Prior Publication Data

US 2018/0274625 A1    Sep. 27, 2018

Related U.S. Application Data

(60) Provisional application No. 62/413,677, filed on Oct. 27, 2016.

(51) Int. Cl.
| | |
|---|---|
| *F16F 13/06* | (2006.01) |
| *B60R 21/02* | (2006.01) |
| *B65D 81/02* | (2006.01) |
| *A41D 29/00* | (2006.01) |
| *A41D 13/015* | (2006.01) |
| *B65D 81/05* | (2006.01) |
| *A41D 31/28* | (2019.01) |

(52) U.S. Cl.
CPC .......... *F16F 13/06* (2013.01); *A41D 13/0156* (2013.01); *A41D 29/00* (2013.01); *B60R 21/02* (2013.01); *B65D 81/022* (2013.01); *B65D 81/05* (2013.01); *A41D 31/28* (2019.02); *A41D 2600/10* (2013.01); *A41D 2600/20* (2013.01)

(58) Field of Classification Search
CPC ........... F16F 13/06; A41D 13/015; F41H 1/02
See application file for complete search history.

(56) References Cited

U.S. PATENT DOCUMENTS

| | | | |
|---|---|---|---|
| 7,288,326 B2 | 10/2007 | Elzey et al. | |
| 8,087,101 B2 | 1/2012 | Ferguson | |
| 8,155,496 B1* | 4/2012 | Cumberland | F41H 5/0414 385/147 |
| 8,197,930 B1 | 6/2012 | Jacobsen et al. | |
| 8,272,309 B1 | 9/2012 | Cumberland et al. | |
| 8,353,240 B1* | 1/2013 | Schaedler | F41H 5/007 89/36.02 |
| 8,679,047 B2 | 3/2014 | Holt et al. | |
| 2002/0192268 A1* | 12/2002 | Alwattari | A45D 37/00 424/443 |

(Continued)

FOREIGN PATENT DOCUMENTS

EP    2733744 A1    5/2014

OTHER PUBLICATIONS

Bono, James, "Livermore researchers create engineered energy absorbing material", Lawrence Livermore National Laboratory, Aug. 20, 2014, 4 pages.

*Primary Examiner* — Bradley T King
(74) *Attorney, Agent, or Firm* — Dorsey & Whitney LLP

(57) ABSTRACT

Disclosed herein is an integrated combination of materials within a vesicle, comprising a space filling porous or fibrous structure and an engineered nonuniform elastic truss to form an impact mitigating Hybrid Material System (HMS). The macroscale and microscale structures within the HMS can be configured to absorb kinetic energy and reduce the forces transmitted by impacts through the HMS to any surface or body in contact with the HMS.

20 Claims, 20 Drawing Sheets

(56) References Cited

U.S. PATENT DOCUMENTS

| | | | |
|---|---|---|---|
| 2004/0250446 A1* | 12/2004 | Greene | A43B 7/08 36/25 R |
| 2006/0234577 A1 | 10/2006 | Wagner et al. | |
| 2009/0272254 A1* | 11/2009 | Hunn | F41H 7/042 89/36.02 |
| 2011/0036234 A1* | 2/2011 | Fisher | F41H 5/0414 89/36.02 |
| 2012/0159810 A1* | 6/2012 | Klassen | A43B 13/181 36/28 |
| 2014/0356585 A1 | 12/2014 | Duoss et al. | |
| 2018/0153245 A1* | 6/2018 | Pannikottu | A42B 3/121 |
| 2019/0145740 A1* | 5/2019 | Czerski | A41D 31/28 |

* cited by examiner (a)

(b)

(a)

(b)

(a)

(b)

(a)

(b)

NON-UNIFORM TRUSS HYBRID MATERIAL SYSTEM

CROSS-REFERENCE TO RELATED APPLICATIONS

This application claims benefit of priority pursuant to 35 U.S.C. § 119(e) of U.S. provisional patent application No. 62/413,677 entitled "Non-Uniform Truss Hybrid Material System," filed on Oct. 27, 2016, which is hereby incorporated by reference in its entirety.

FIELD OF INVENTION

This disclosure generally relates to composite material, and more specifically relates to Impact mitigating composite material.

BACKGROUND

Current impact mitigating materials are commonly comprised of foams, woven fibers, gels, shear thickening fluids, compressed gases, and combinations thereof. When these structures are compressed by the forces of an impacting object or surface, they de-accelerate the surface of the impacting object by dissipating kinetic energy through its conversion into alternative forms. Energy can be transferred into other forms via such mechanisms as stretching of interatomic bonds (elasticity), increasing the density of confined volumes of gases or compressible fluids, compression of low density foams, heating through frictional sliding, inelastic deformation of crystalline solids, and pressure-induced solid or liquid phase transformations. These mechanisms operate in impact mitigation systems ranging from polyurethane foam volleyball knee pads to metallic roadside crash barriers. Typical impact mitigating materials occupy a predefined volume which is reduced when subject to impact. Thus an initially low density volume invariably increases in density during an impact event.

While existing impact mitigating materials are functional, their impact absorption abilities may be improved by increasing the thickness of the impact volume of material. This increases the amount of protection by providing a longer period of time of deceleration during an impact event, thereby potentially decreasing the maximum deceleration, and also the maximum transmitted force. For most impact mitigating materials, only the volume of material in direct contact with or in the immediate vicinity of the impacting object contributes to deceleration of the impacting object. Consequently, the transfer of kinetic energy density is particularly high in the region of contact, placing the highest demand on the material there to dissipate kinetic energy and decelerate an impacting object.

For some applications of impact absorbing materials, there are limitations on the thickness of material that can be employed to provide protection. Large thicknesses may not be acceptable in applications for which limited space, limited weight, freedom of movement, or aesthetics are important. For such applications additional mechanisms other than increasing material thickness are desirable to absorb impact energy.

Another potential problem with some impact mitigating materials is the tendency for their absorbing ability to incrementally or completely diminish after one or more repeated impact events. Impact absorbing materials that rely on energy dissipative mechanisms which have long time constants for recovery are only partially effective against impacts that recur with a frequency higher than the time needs with restitution of the energy absorbing abilities.

There exists a need for an improved impact mitigating composite material which integrates specific combinations of materials to overcome these potential problems.

The information included in this Background section of the specification, including any references cited herein and any description or discussion thereof, is included for technical reference purposes only and is not to be regarded subject matter by which the scope of the disclosure and its embodiments is to be bound.

BRIEF SUMMARY

In some examples, an impact mitigating composite material may comprise a non-uniform elastic truss within a hybrid material system. Disclosed herein is an apparatus for impact mitigation comprising: a vesicle; a space filling porous or fibrous structure; a shear thickening fluid; and a truss structure having a plurality of non-uniform struts, each strut having a length and a cross-section normal to the length. In one embodiment, the cross-section of each of the non-uniform struts varies along the length and the struts are configured to reduce inhomogeneity of strain energy when a strut is deflected. In some embodiments, an elastic limit of each of the non-uniform struts varies along the length and the struts are configured to cause uniform distribution of strain energy during an impact event. In other embodiments, a shape of the struts of the truss structure varies along the length of each strut, and the struts are configured to increase a total strain energy that can be accommodated during and after an impact event without a permanent deformation to the truss structure. In still other embodiments, the configuration of the struts to form the truss structure forms a three-fold symmetry in the plane of the truss, or the configuration of the struts of the truss structure is modulated to vary in a ratio of an axial and a bending deformation along the length of the struts during an impact event. In various embodiment, the plurality of non-uniform struts is replaced by a plurality of discs and the configuration of discs is modulated to vary a ratio of an axial and a bending deformation from a top to a bottom of each disc. The disclosed apparatus, in some embodiments, includes a width of each of the struts matches the dimension of the periodic array in one direction.

The disclosed apparatus, in some embodiments, is configured to reduce an impact force sustained to a user during a sport activity, or to reduce an impact force sustained to a package during a packaging or transportation activity, or to reduce an impact force sustained to a military or police personnel, or to reduce an impact force sustained to an industrial worker. In some embodiments, the apparatus is contained within active wear and the apparatus is configured to reduce an impact force sustained to a user wearing the activewear during fitness training, or to reduce an impact force sustained to a human or animal during a transportation event.

In some embodiments, the disclosed apparatus is configured so that each strut has a first end and a second end and four non-uniform struts are coupled together at a first end to form a sub-truss, and a plurality of sub-trusses are coupled together at the second ends of the non-uniform struts to form the truss structure, or each strut has a first end and a second end and five non-uniform struts are coupled together at a first end to form a sub-truss, and a plurality of sub-trusses are coupled together at the second ends of the non-uniform struts to form the truss structure, or each strut has a first end and a second end and six non-uniform struts are coupled together at a first end to form a sub-truss, and a plurality of sub-trusses are coupled together at the second ends of the non-uniform struts to form the truss structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

DETAILED DESCRIPTION

In some examples, the disclosed Hybrid Material System (HMS) incorporates multiple components to mitigate the effects of impact. The components include (1) a low density space filling structure (such as a foam or fibers) which is impregnated with (2) a shear thickening fluid (which may include suspended particles), both of which are contained within a (3) polymeric vesicle, within which there is also (4) an embedded truss-like lattice.

In some examples, the HMS incorporates the truss-like structure and the integration of multiple materials, with specific geometric properties and physical properties into a single system, all of which may be engineered to complement each other to provide a customized high level of mitigation of the effects of impact. In some examples, the truss-like structure provides an additional mechanism for absorbing energy and reducing the magnitude of force that can be transmitted through an impact mitigating pad.

In some examples, an advantage of creating superior impact energy absorption is the ability to produce thinner, lighter, and more flexible padding. In some examples, these three characteristics: thin, light, and flexible exist in the design of all four HMS components.

In some examples, the impact mitigating composite material may help to enhance a level of energy absorption, enhance an ability to reduce transmitted force from impact, and enhance an ability to sustain repeated loadings without diminishing impact protection.

In some examples, the impact mitigating composite material may have improved performance based on, in part, from adding truss-like lattices with non-uniform geometric properties or non-uniform material properties to any, or all, of the following constituents: cellular foams, shear thickening fluids within a porous space filling structure, including, for example, foams containing impregnated shear thickening fluids. In some examples, the truss-like structure is intentionally designed to be non-uniform in its geometric or materials properties in order to maximize its ability to absorb energy through elastic deflections.

Figure 1:
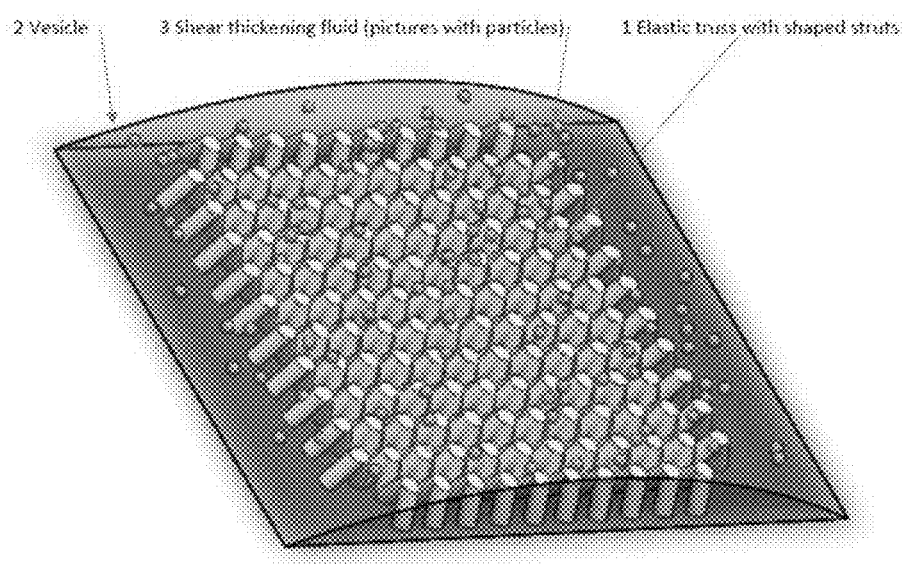
FIG. 1 is a schematic of a Hybrid Material System

FIG. 1 is a schematic of hybrid material system. FIG. 1 shows that one embodiment may include four components: a truss-like lattice, a vesicle wall, a shear thickening fluid, and a space filling structure (not shown in FIG. 1). FIG. 1 shows (1) the truss-like lattice with non-uniform diameter struts shown with other components of a Hybrid Material System: (2) a polymeric vesicle wall that creates a volume which contains (3) a shear thickening fluid (which may include suspended particles). A fourth component (not shown) is a porous or fibrous space filling structure (such as a foam) which may fills the vesicle, but is not drawn in the figure to avoid obscuring the view of the truss structure. The porous or fibrous structure may take any of several forms that allow the transmittal of energy into the shear thickening fluid. The elastic truss, which may have shaped struts, is embedded within the shear thickening fluid and the porous or fibrous structure in a manner that promotes non-Newtonian shear thickening when the vesicle is compressed by external forces.

FIG. 1 displays only one embodiment of the disclosure. For instance, the geometry of the elastic truss, the shape of the struts, or other implementations of nonuniformity envisioned for embodiments can be modified for different levels of impact. Other elements of the HMS such as the vesicle, porous or fibrous filling structure, and shear thickening fluid properties can be customized as well. For example, the shear thickening fluid may be one of several fluids that contain specific concentrations of particles with specific sizes and shapes. FIG. 1 shows various possible constituents of the HMS in conjunction with the truss-like structure with its non-uniform struts.

The energy absorbing ability of the HMS and its ability to mitigate the effects of impact may be a result of providing multiple energy absorbing mechanisms. The truss may absorb energy through elastic distortion of its struts while the shear thickening fluid increases its energy absorption non-linearly with increasing rates of fluidic shearing. The porous or fibrous space filling structure also absorbs energy as its structural elements are compressed by impact forces.

Vesicle

In some examples, the vesicle is the outer container for the HMS. It is a monolithic solid or woven fiber made from a polymer, which may have the properties within the ranges listed in Table 1. The choice of an embodiment of the vesicle using a woven fiber or monolithic thin layer may depend upon the application. For applications in which greater gas permeability (that is, breathability) is desired, woven fibers may be used.

TABLE 1

Ranges of vesicle properties

| Property | Value | Comment |
|---|---|---|
| Thickness | 0.05-0.5 mm | |
| Elastic modulus | 35,000-350,000 (kg/cm$^2$) | Relates to flexibility. ASTM D882 |
| Compressibility | 2 psi at 25% deflection | Determines softness |
| Tensile Strength | >10 ksi (68.95 MPa) | ASTM D882. |
| Elongation | >100% | ASTM D882 |
| Surface friction | Depends on impact mitigation application, not specified here | Determines suitability for insertion into fabric pockets. ASTM D1894. |
| Compression set | <10% at 37 C., after 22 hours | Determines resistance to sustained duration loads. ASTM D 1667-90 Test D (room temperature), ASTM D3574-95 Test D (70 C.), ASTM D 395 |
| Density | 0.1 to 0.5 g/cm$^3$ | Determines lightness. ASTM D3574-95. ASTM D1505. |
| Tear resistance | Depends on impact mitigation application, not specified here | Determines suitability for high abrasion applications. ASTM D412, ASTM D624 |

Different vesical materials can be employed in the HMS, including commercially available formulations of polyesters, polyurathanes, silicones, or other elastomers or low density materials. The selection of vesicle material for use in the HMS depends upon impact the mitigating applications, and upon the aggregate properties that result when combined with the other components. For example, polyurethanes have high tear resistance while silicones have poor tear resistance. For abrasion-sensitive applications, may be used instead of silicones.

Space Filling Structure

In some examples, the porous or fibrous space filling structure may address three aspects: (1) absorbing a general portion of the impact energy, (2) containing the shear thickening fluid, and (3) housing the truss-like structure. In some examples, one embodiment of the space filling structure may be polyurethane foams, which may address all three aspects. They provide microcellular cavities that are readily loaded with shear thickening fluid formulations. Alternative embodiments of shear thickening may be employed as well, for example, shear thickening filaments, shear thickening gels, shear thickening layers, or shear thickening composites. The range of characteristics for the space filling structure appear in Table 2.

TABLE 2

Attributes of porous space filling structure.

| Property | Value | Comment |
|---|---|---|
| Density | 0.01-0.50 kg/m$^3$ | |
| Cell size | 0.1-500 μm | 10 μm typical, includes micro- and macro-cellular polymers |

Shear Thickening Fluid

Figure 10:
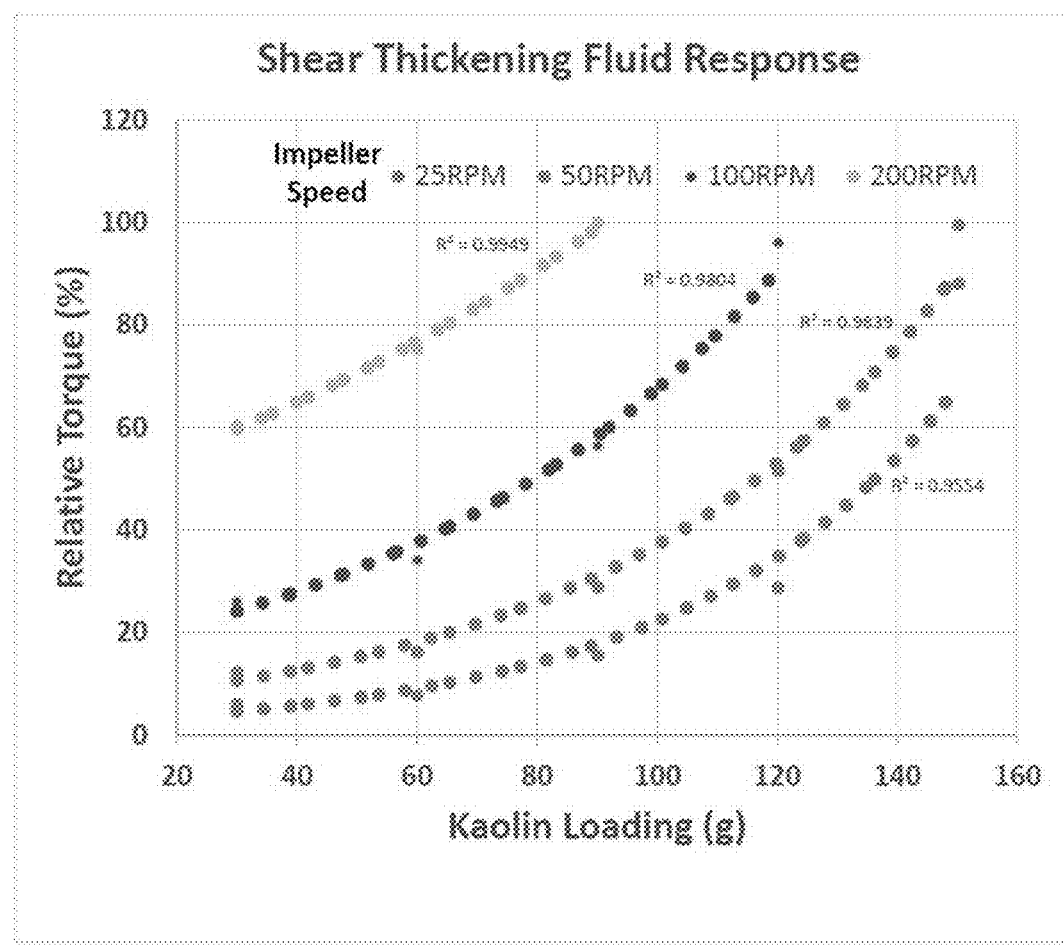
FIG. 10 is a graph of the shear response of polymer loaded with shear thickening kaolin particles.

Shear thickening fluids (STFs) may cause the mechanical response of the HMS to depend upon the rate of deformation of the HMS during impact. Specific formulations of polymers loaded with dispersions of particles were tested during the development of the HMS. In particular, the effects of kaolin particles loaded into a polymeric fluid are shown in FIG. 10. Shear thickening fluids can be introduced into the space filling structure by coating fibers with the particle-loaded polymeric fluid. For a space filling cellular open cell foam, the particle-loaded polymeric fluid can be impregnated by forcing infiltration under pressure. For closed cell foam structures, the STF can be introduced during casting of the foam.

The energy absorbing ability of cellular foams or woven fibers can also be enhanced by the addition of shear thickening fluid. In some examples, energy is absorbed as a result of dissipation via non-Newtonian flow. Motion of the fluid is resisted by shear, but at a force level that increases with increasing fluid velocity.

Figure 8:
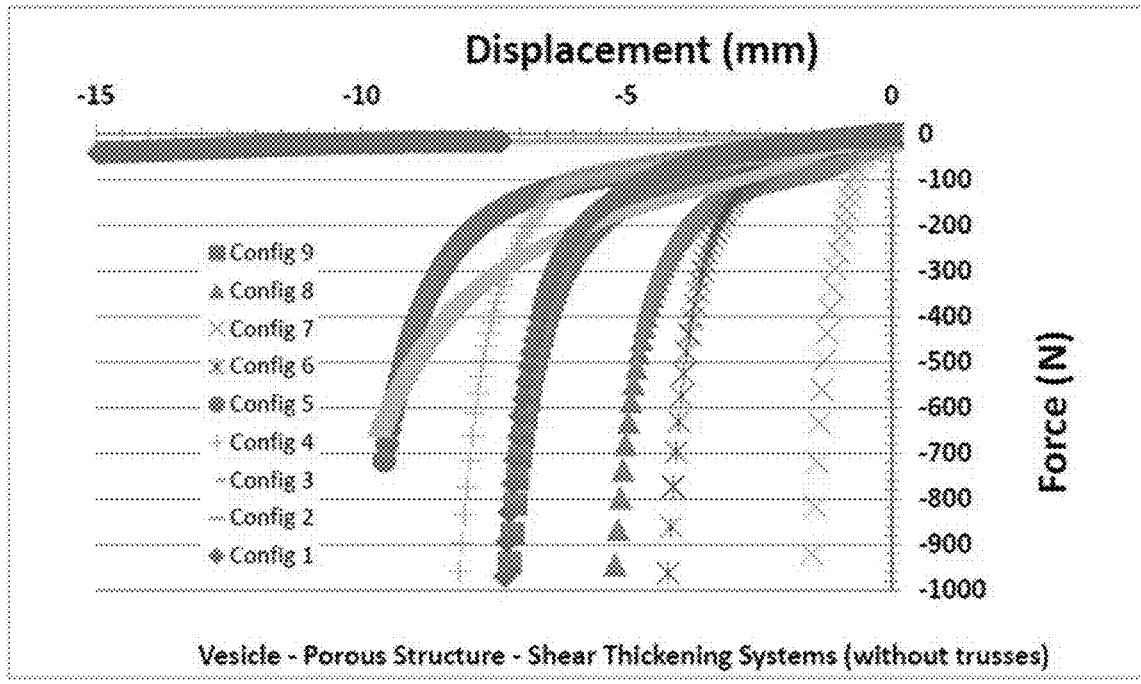
FIG. 8 is a graph of the force-displacement response measured for multiple configurations of commercially available cellular foam impact mitigation systems.
Figure 9:
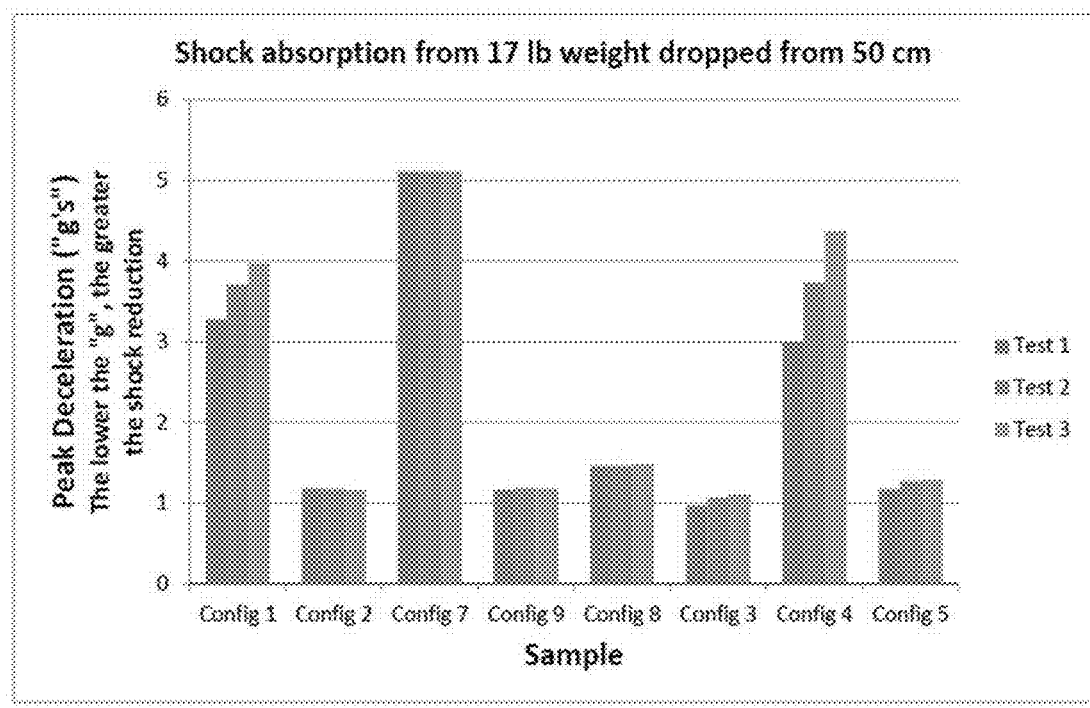
FIG. 9 is a graph of the results of measurement of maximum deceleration obtained from drop tests. Each test was repeated three times.

FIG. 8 is a graph of the force-displacement response measured for multiple configurations of commercially available cellular foam impact mitigation systems. Nine configurations of polymeric cellular impact mitigating systems containing varying amounts of shear thickening fluids were tested quasi-statically and dynamically. The results of quasi-static testing are shown in FIG. 8. FIG. 9 is a graph of the results of measurement of maximum deceleration obtained from drop tests. Each test was repeated three times. The results of dynamic drop tests are shown in FIG. 9. The impact force for both quasi-static and dynamic testing was applied over a circular area with a diameter of 19 mm.

FIG. 10 is a graph of the shear response of polymer loaded with shear thickening kaolin particles.

Truss-Like Structure

In some examples, the truss-like structure possessing shaped struts is a fourth component of the HMS. In some examples, the truss-like structure is designed to possess the following attributes: (1) deflection via exclusively or a majority of elastic deformation, (2) absorbs mechanical energy primarily via axial compression or tension of members within the truss-like structure, (3) is embedded within the space filling structures, (4) possesses geometries that stimulate shearing deformation within the space filling structure within which it is embedded.

The energy absorbing ability of the elastic truss depends upon the geometry and elastic properties of its members. Variation of specific characteristics of the truss alter its energy absorbing properties. For example, varying the angle of orientation of the truss members with respect to the principal impact loading direction may alter the relative amounts of axial compression and bending deformation in the members.

Figure 2:
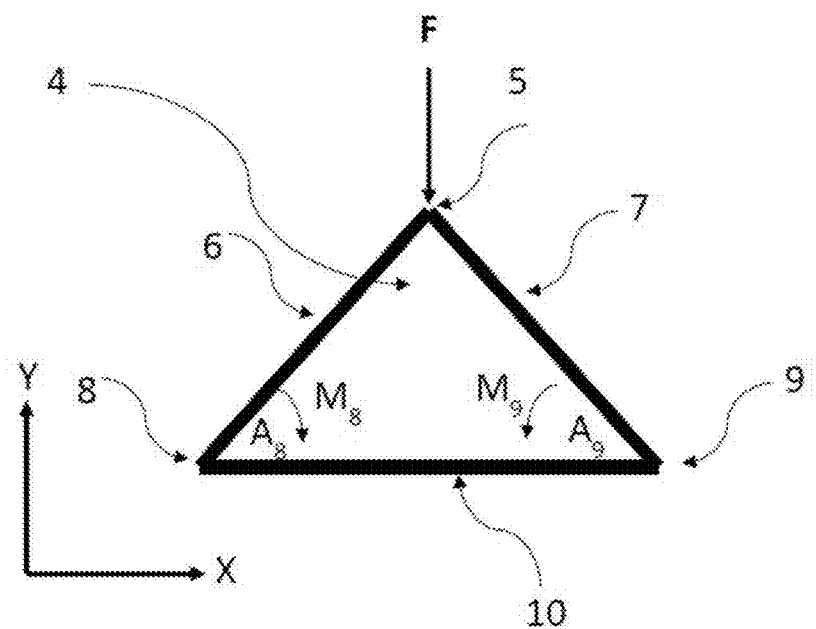
FIG. 2 is a schematic of a triangular truss in 2 dimensions subject to a vertical impact force F.

FIG. 2 is a schematic of a triangular truss in 2 dimensions subject to a vertical impact force F. FIG. 2 shows a 2-dimensional triangular arrangement of deformable structural members (4) arranged in a plane within a Cartesian coordinates system with horizontal coordinates x and vertical coordinates y. When an impact force F is applied at point 5 in the y direction, the angled members 6 and 7 are compressed along their length. In addition, there is a bending moment at the intersections 8 and 9 of the angled members when they are rigidly adjoined to horizontal member 10. The axial compression of the angled members 6 and 7 and the bending moment at 8 and 9 both absorb energy imparted by the load as the angled members shorten under the load and rotated under the bending moment. However, the relative amount of energy absorbed by bending as opposed to axial compression and shortening of members 6 and 7 depends upon the angles $A_8$ and $A_9$ at junctions 8 and 9. When $A_8$ and $A_9$ are small, for example, less than 20°, then the resistance to bending at joints 8 and 9 absorbs a larger fraction of energy. In contract, with $A_8$ and $A_9$ are larger, for example greater than 70°, then the energy expended by bending is small relative to the energy absorbed by axial compression of members 6 and 7.

Figure 3:
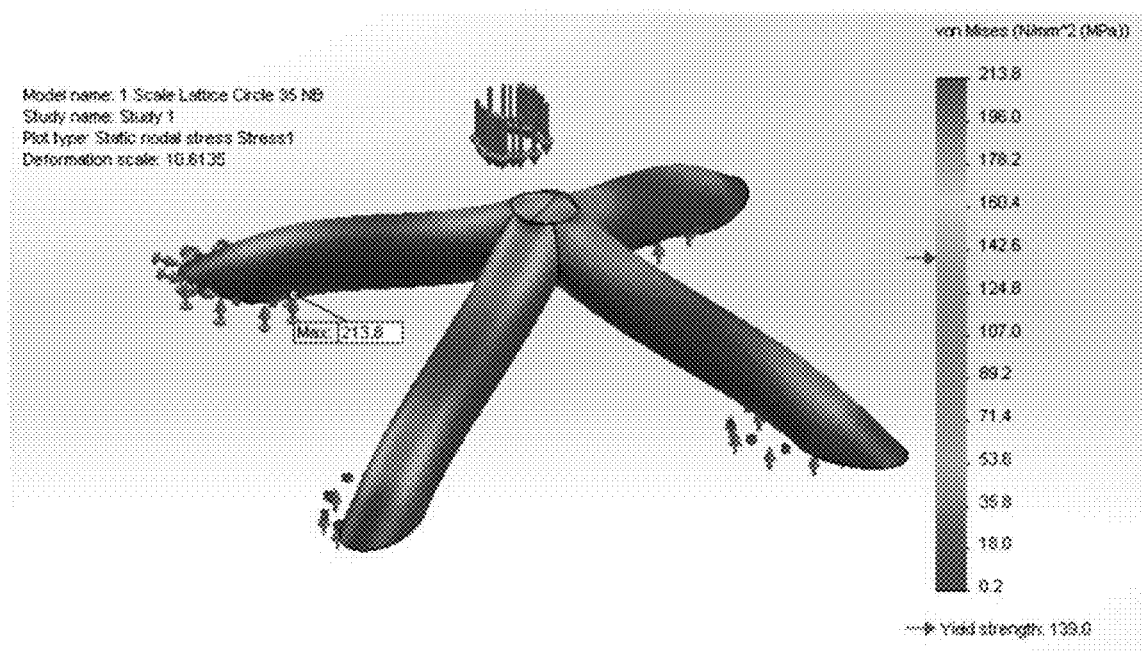
FIG. 3 is a schematic of the elastic stresses and deflections in a 35 degree truss structure.
Figure 4:
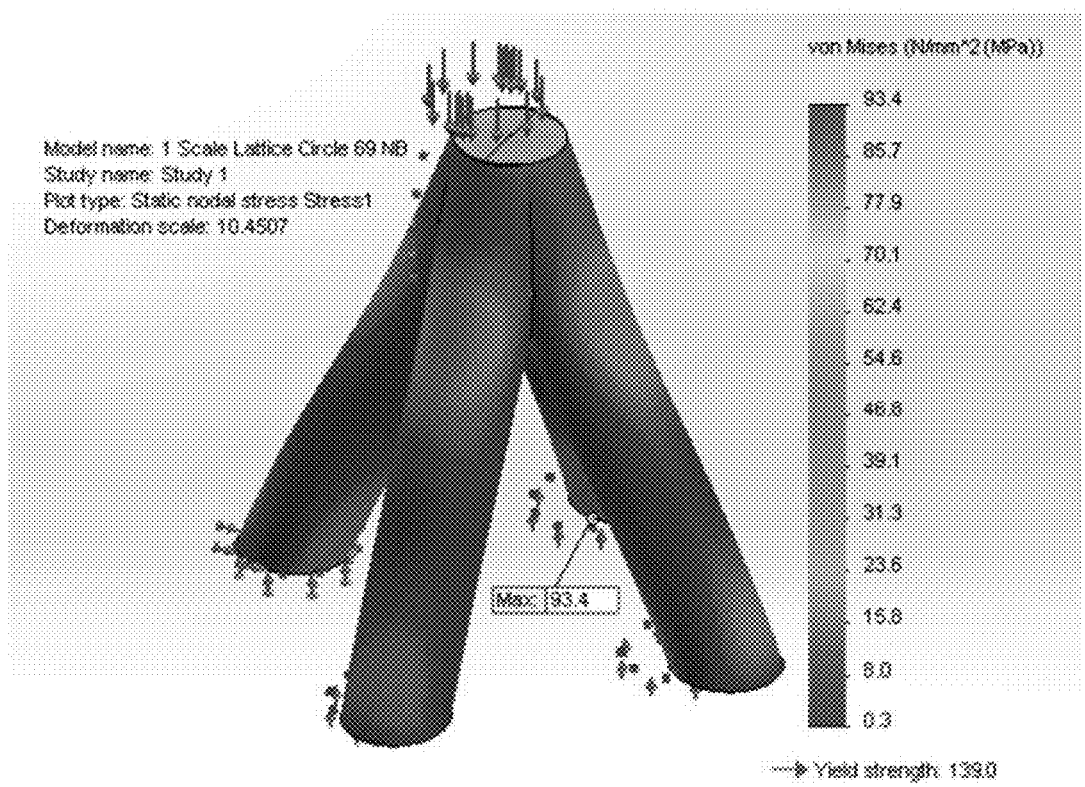
FIG. 4 is a schematic of elastic stresses and deflections in a 69 degree from horizontal truss structure.
Figure 5:
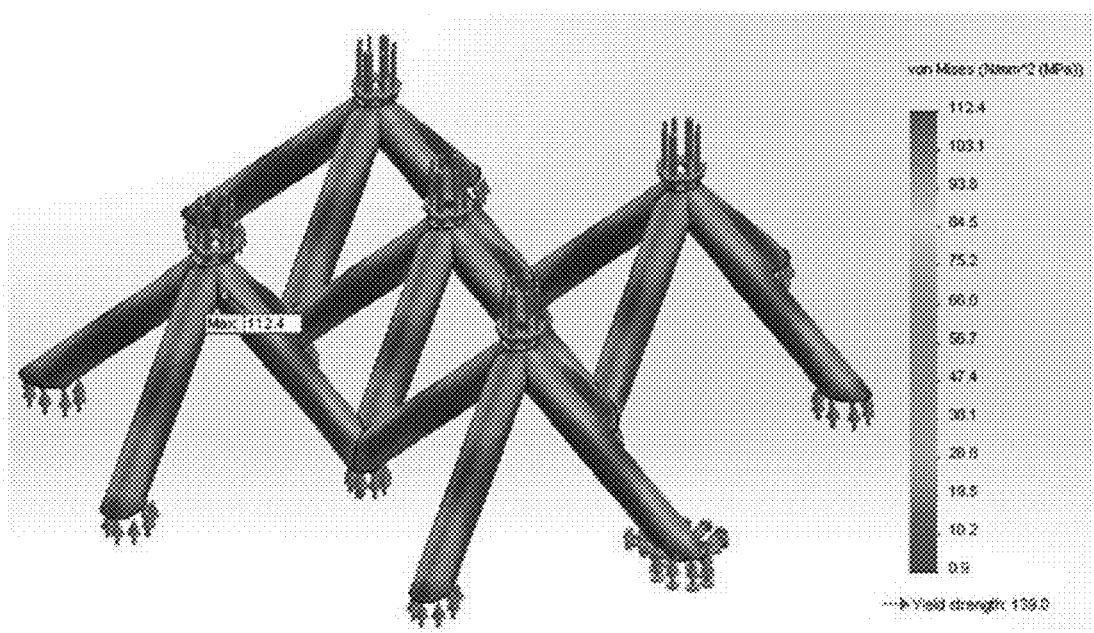
FIG. 5 is a schematic of a Finite Element Method analysis of Von Mises effective stresses induced by compression of a periodic array of Elastic Truss structures.

FIG. 3 is a schematic of the elastic stresses and deflections in a 35 degree truss structure. FIG. 3 shows the results of Finite Element Method (FEM) calculations of loading of a 3-dimensional truss containing members possessing an initial 35 degree angle from horizontal. In many embodiments the angle may be greater than about 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 45°, 50°, 55°, 60°, 65°, or 70°, and less than about 70°, 65°, 60°, 55°, 50°, 45°, 40°, 39°, 38°, 37°, 36°, 35°, 34°, 33°, 32°, 31°, 30°, 29°, 28°, 27°, 26°, 25°, 24°, 23°, 22°, 21°, 20°, 19°, 18°, 17°, and 16°. FIG. 4 is a schematic of elastic stresses and deflections members in a 69 degrees from horizontal truss structure. For comparison with the truss in FIG. 3, the truss shown in FIG. 4 has members with an initial 69 degree angle from the horizontal. In both trusses, the boundary conditions applied at the base of the truss prevent displacement of one angled member, while the remaining three can move freely in the horizontal plane. The actual deflections are amplified in this rendering to better show the effect of loading. For the same amount of applied force, the stresses in the 35 degree truss are much larger, as are the deflections. The struts of the 35 degree truss undergo substantial bending at their intersections, while the loading of the struts of the 69 degree truss are subject more to co-linear axial stresses along the length of the members rather than bending. FIG. 5 shows a periodic array of a 35 degree lattice under a uniform displacement to an intermediate load level.

Figure 6:
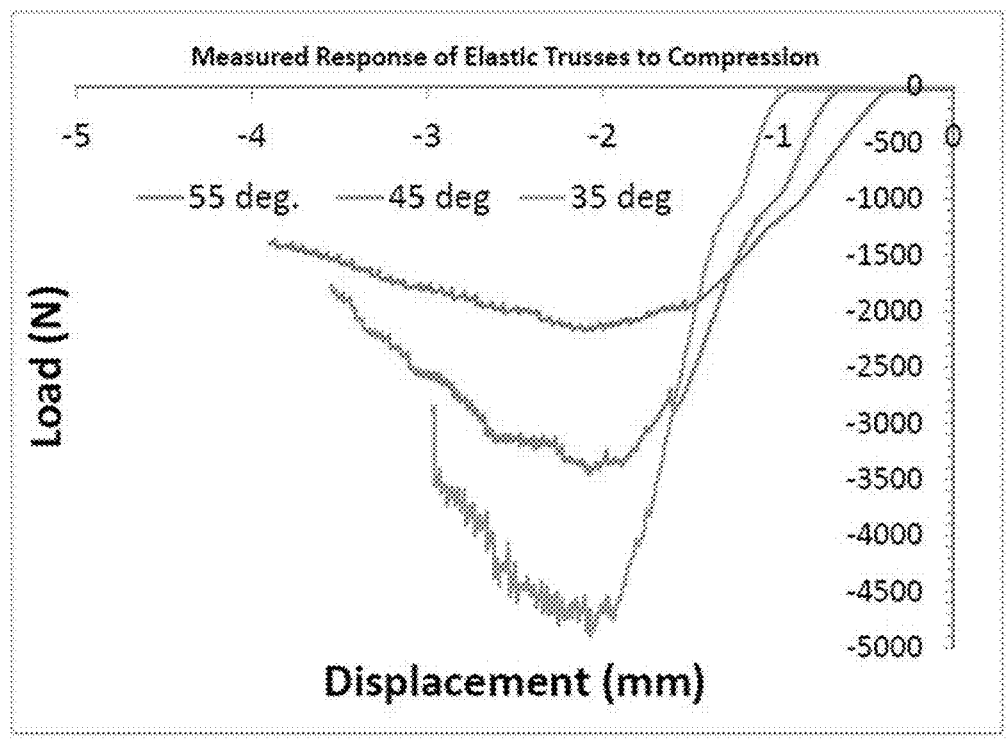
FIG. 6 is a graph of the measured force-displacement response of trusses with three truss angles: 35 degree, 45 degree, and 55 degree.
Figure 7:
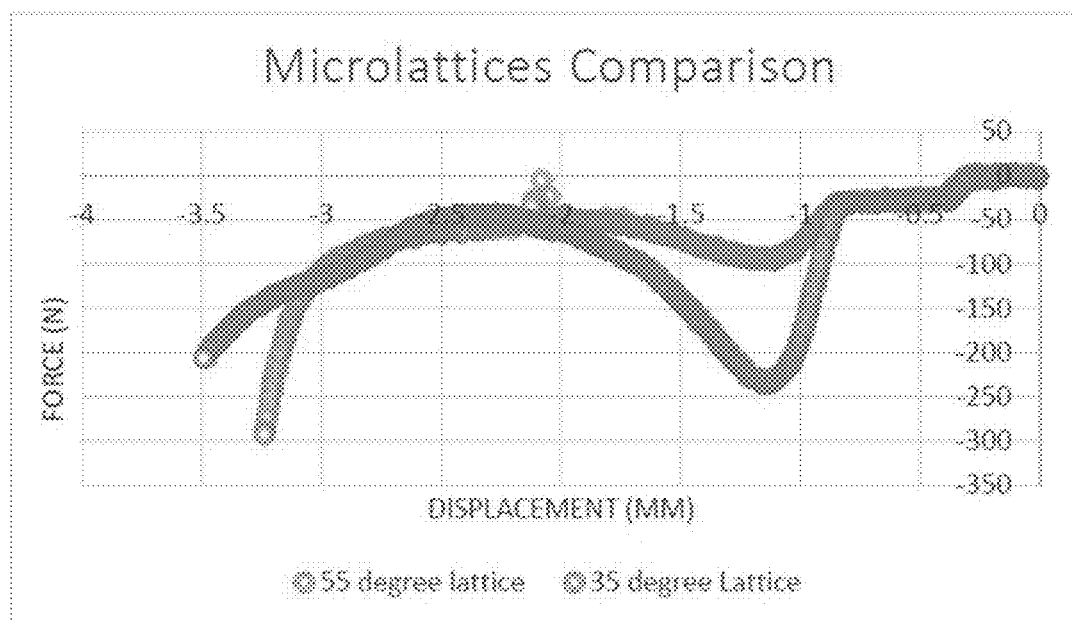
FIG. 7 is a graph of the force-displacement response of a thermoplastic lattice showing the variation in maximum force and energy absorption for two lattice angles.

The relative levels of energy absorption and impact force reduction for specific designs of the elastic truss may be evident from the measured displacement-force responses shown in FIGS. 6 and 7, respectively. FIG. 6 is a graph of the measured force-displacement response of trusses with three truss angles: 35 degree, 45 degree, and 55 degree. The strut diameters are 34.5%, 21.6%, and 20.5% of truss height for 35°, 45°, and 55° truss angles, respectively. In many embodiments, the strut diameter may be greater than about 15%, 16%, 17%, 18%, 19%, 20%, 21%, 22%, 23%, 24%, 25%, 26%, 27%, 28%, 29%, 30%, 35%, or 40%, and less than about 45%, 40%, 35%, 30%, 29%, 28%, 27%, 26%, 25%, 24%, 23%, 22%, 21%, 20%, 19%, 18%, 17%, or 16% the relative height of the strut.

FIG. 7 is a graph of the force-displacement response of a thermoplastic lattice showing the variation in maximum force and energy absorption for two lattice angles. Strut diameter is 20% of truss height. In many embodiments, the truss height, as measured from the planar surface the strut sits upon to the top surface may be greater than about 2 mm, 3 mm, 4 mm, 5 mm, 6 mm, 7 mm, 8 mm, 9 mm, 10 mm, 15 mm, or 20 mm, and less than about 25 mm, 20 mm, 15 mm, 10 mm, 9 mm, 8 mm, 7 mm, 6 mm, 5 mm, 4 mm, or 3 mm. The area under the displacement-force curves for a given amount of compressive displacement (shown in units of millimeters in the figures) is equal to the amount of energy that the system can absorb. In some examples, it may be desirable that the amount of energy absorbed is within less than about 5 mm, and preferably about 2 mm, of compressive displacement. In some embodiments the amount of energy absorbed is greater than about 100 N, 200 N, 300 N, 400 N, 500 N, 600 N, 700 N, 800 N, 900 N, 1000 N, 1500 N, 2000 N, 2500 N, 3000 N, 3500 N, 4000 N, 4500 N, 5000 N, 5500 N, and 6000 N, and less than about 6500 N, 6000 N, 5500 N, 5000 N, 4500 N, 4000 N, 3500 N, 3000 N, 2500 N, 2000 N, 1500 N, 1000 N, 900 N, 800 N, 700 N, 600 N, 500 N, 400 N, 300 N, and 200 N.

Trusses corresponding to the Finite Element model designs may be constructed from a thermosetting plastic, or other suitable material well known in the art. The force-displacement response of trusses with three specific truss angle was measured. The results, shown in FIG. 6 demonstrate how the energy absorption of the trusses varies with angle for trusses with 35 degree, 45 degree, and 55 degree angles. Decreasing the truss angles results in more axial rather than bending stresses in the member, and therefore greater energy absorption. The area under the force-displacement curves correspond with the amount of energy absorbed, and stored elastically in the trusses. In FIG. 6 the greatest amount of energy is absorbed by the 35 degree truss. The results scale linearly with elastic modulus to other truss materials, as shown for a thermoplastic truss in FIG. 7.

FIG. 5 is a schematic of a finite element method analysis of Von Mises effective stresses induced by compression of a periodic array of elastic truss structures.

One purpose of the designs and analysis thereof is to show that lattices can be added to conventional foam-based impact absorbing foams or woven textiles to customize and enhance their energy absorption and impact mitigating abilities.

In FIG. 9 the peak deceleration measured in drop tests is shown for some of the same impact mitigation materials tested quasi-statically. A 17 pound impactor was dropped from 50 cm onto comparison cellular foam products three times in succession. The time between each successive drop was approximately 1 minute. Deceleration upon impact was measured via an accelerometer attached to the drop weight. The acceleration throughout the drop was recorded for each test. The peak deceleration may be of interest, since the effectiveness of an impact absorbing materials may depend, in part, on its ability to reduce the maximum force that is transmitted from the impacting object and the substrate to be protected. The highest performing pad configurations were able to reduce the peak deceleration to approximately 1 g (where g=the acceleration of the earth's gravity). The lowest performing product allowed decelerations higher than 5 g.

Also, five of the eight products tested displayed some degree of deterioration of the impact mitigating ability with successive impacts. This deterioration is most notable for Configurations 1 and 4 in FIG. 8.

Of note are the levels of force and amounts of energy that can be absorbed after displacements less than 2 mm. None of existing impact mitigation systems tested could support a load greater than 100 N within a displacement range of 2 mm. In contrast, the engineered lattices loaded in the same manner as the existing available products can be tuned to sustain loads between 100 N and 4000 N within 2 mm of compressive displacement. The addition of such lattices to simple cellular foams or woven fibers, which may or may not contain shear thickening fluids, can enhance energy absorption performance.

Figure 11A:
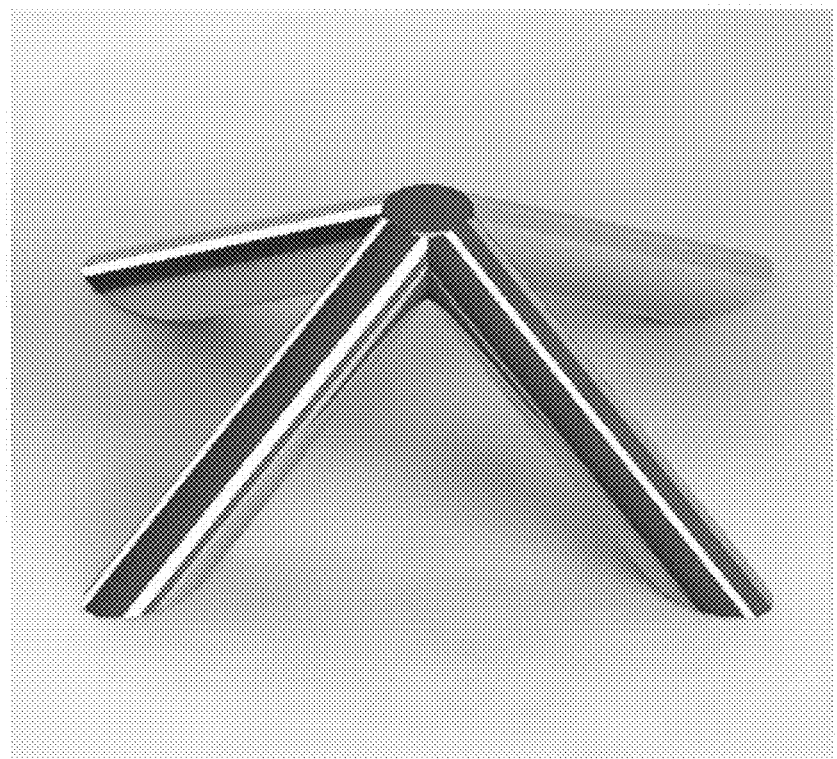
FIG. 11A is a perspective view of a truss-like structure with a solid, straight strut design.
Figure 11B:
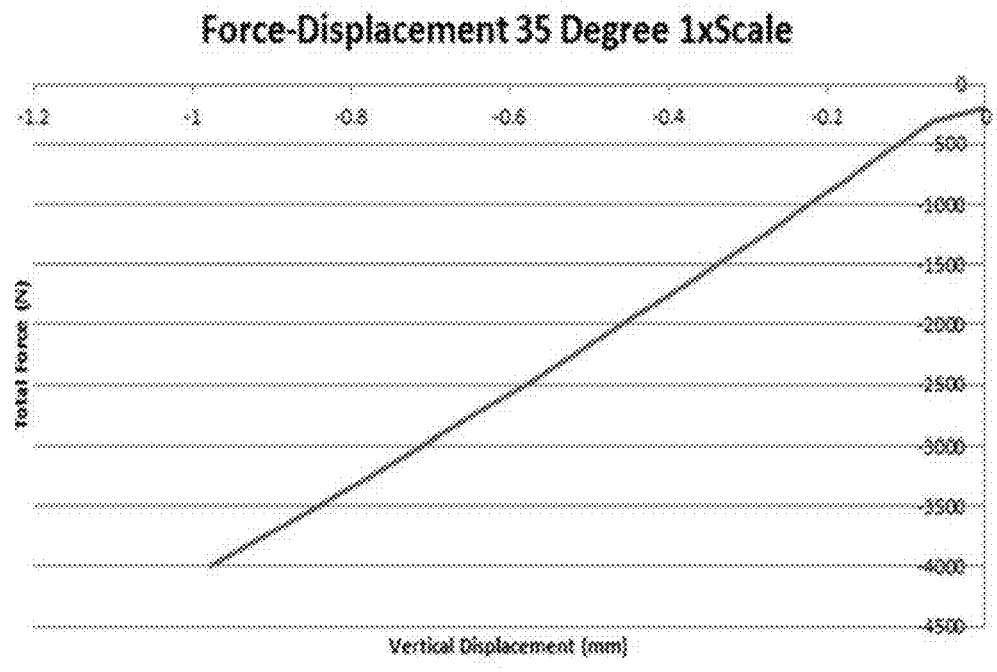
FIG. 11B is a graph of a force-displacement response.
Figure 12A:
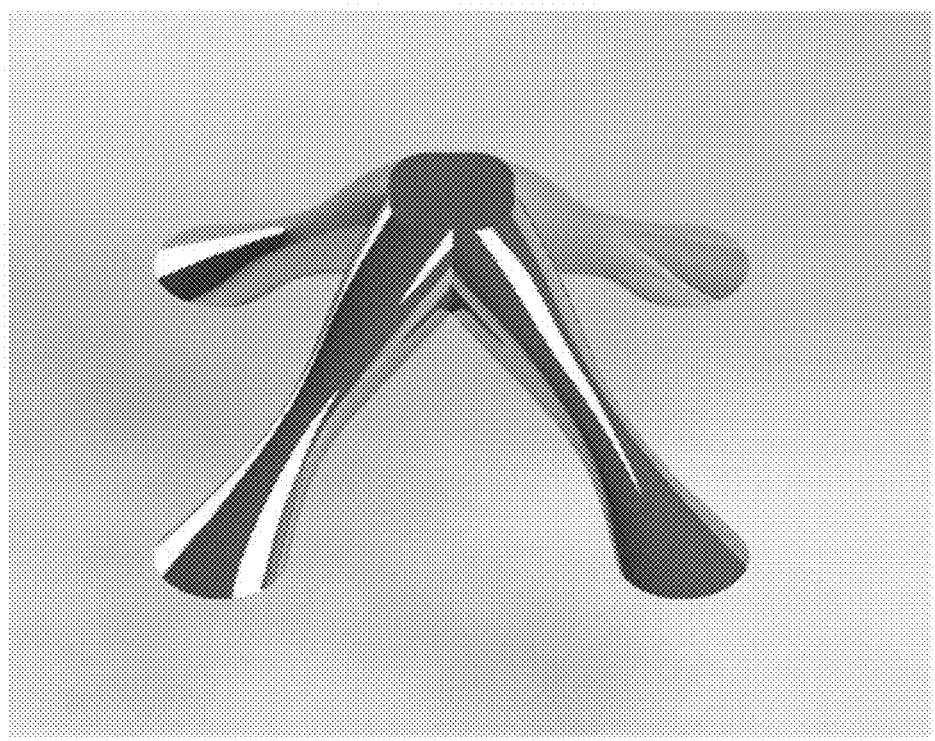
FIG. 12A is a perspective view of a truss-like structure with a solid, shaped strut design.
Figure 13:
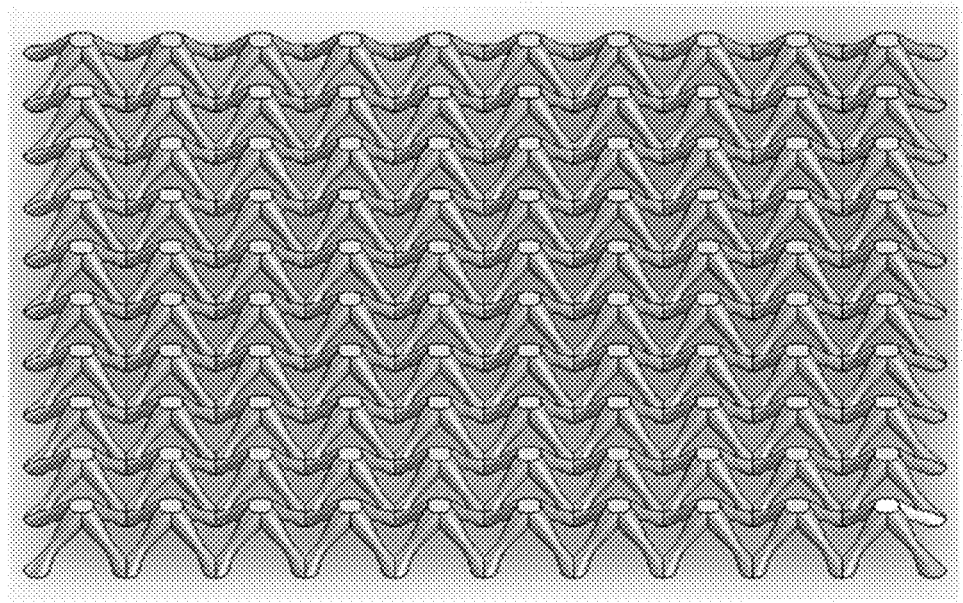
FIG. 13 is a schematic of a periodic array of variable diameter struts.

FIG. 11A is a perspective view of a truss-like structure with solid straight strut design. FIG. 12A is a perspective view of a truss-like structure with solid, shaped strut design. FIG. 13 is a schematic pf a periodic array of variable diameter struts. Two embodiments of the truss-like structure are shown in the FIGS. 11A and 12A. Each figure contains a computer-aided-drawing (CAD) rendering of an perspective view of a single period of a structure that can be repeated periodically in the horizontal plane (according to the plane of the figure). For example, the replication of the Solid Straight Strut design to create a periodic array can be seen in FIG. 5. The variation in color shown on the surface of the solid straight struts in FIG. 5 depicts the variation in effective stress (von Mises stress or the octahedral stress). The color red corresponds to a high stress, while the color blue corresponds to a low stress. Colors in between red and blue in the rainbow spectrum represent intermediate levels of stress. Regardless of the absolute magnitude of the effective stress, there is clearly a variation in stress between the ends and the midsection of every strut. This variation also corresponds with a variation in the elastic strains. While the stress levels are all below the elastic limit for the loading applied, they are higher at the top and bottom ends of every strut. Thus, the stresses and strains near approximately the mid-strut point along the length of each strut are lower than near the top or bottom of the struts. Because of this variability in strain, the total strain energy $E_{tot}$ induced by deflection of the truss, defined as:

$$E_{tot} = \int^V \int_0^\varepsilon \sigma d\varepsilon dV$$

will be reduced because the local strain energy is non-uniform along each strut. Thus the amount of energy from an impacting object will be lower in the central portion of each strut. This results in reduced effectiveness of the truss-like structure in absorbing impact energy.

For a strut comprised of a monolithic material, the maximum elastic strain that can be sustained without inducing permanent, non-recoverable deformation will be uniform throughout the entire truss-like structure. This is the equivalent to noting that the stress level for yielding will be the same within the constituent material throughout an entire truss-like structure. Whenever there is variability of elastic strain, the energy density within the truss-like structure will be sub-optimal. Consequently, the point within the truss-like structure that undergoes the most strain during impact will determine the maximum strain at every other point. One feature of some of the examples described herein is possessing a strain energy distribution that is designed to be more uniformly absorb energy. This can be achieved by: (1) modulating the geometry or (2) modulating the material properties within every strut to anticipate the non-uniformity of the strain and stress distributions.

Figure 12B:
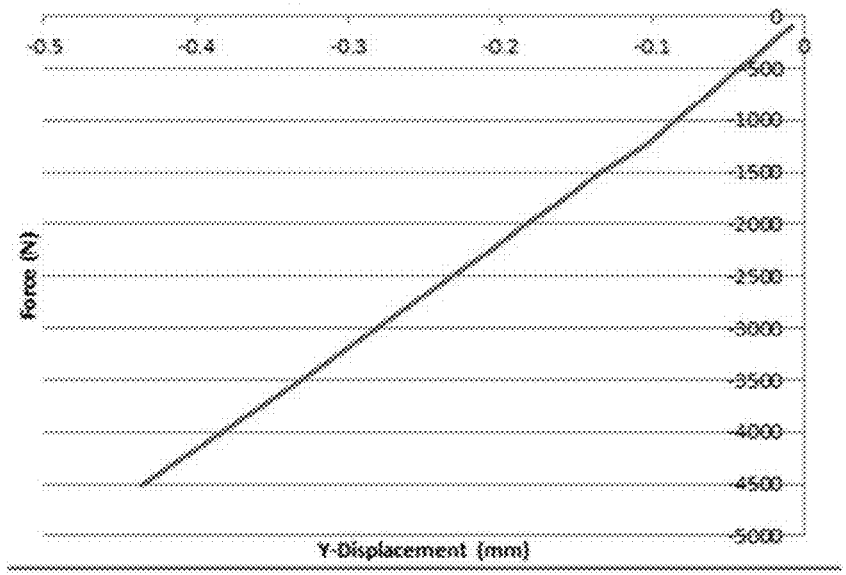
FIG. 12B is a graph of a force-displacement response.

FIG. 12A is a perspective view of a truss-like structure with solid, shaped strut design. FIG. 12B is a graph of a force-displacement response. FIG. 12A depicts the approach of introducing shape variations in the struts, deliberately varying the cross-sectional area or cross-section shape of the strut along its length. The design shown in FIG. 12A depicts a variable cross-sectional area while retaining a circular shape. Alternatively, the shape could be varied along the length of each strut, for example by increasing the ellipticity to better resist bending modes of deformation. Bending modes of deformation create higher stresses at the strut surface than in the strut interior. The higher strains and stresses at the surface, as compared to the middle of the volume of a strut at a given coordinate along its length is inefficient. This non-uniformity limits the maximum overall all strain energy that can be imparted to the truss-like structure without causing inelastic deformation.

Figure 14A:
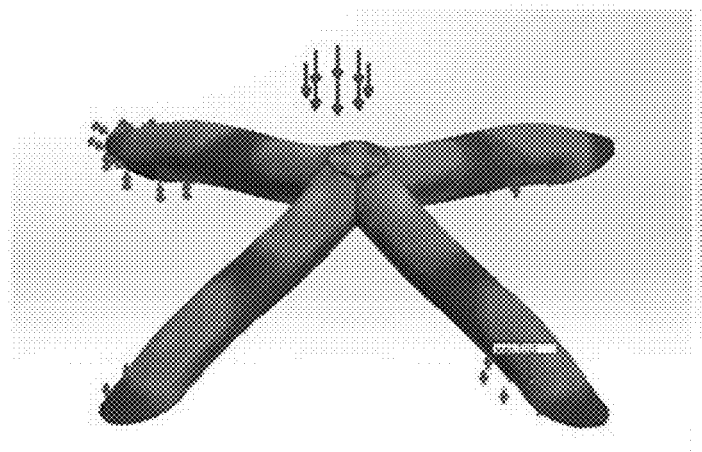
FIG. 14A is a schematic of elastic strain distribution using a truss-like structure with a solid uniform cross section.
Figure 14B:
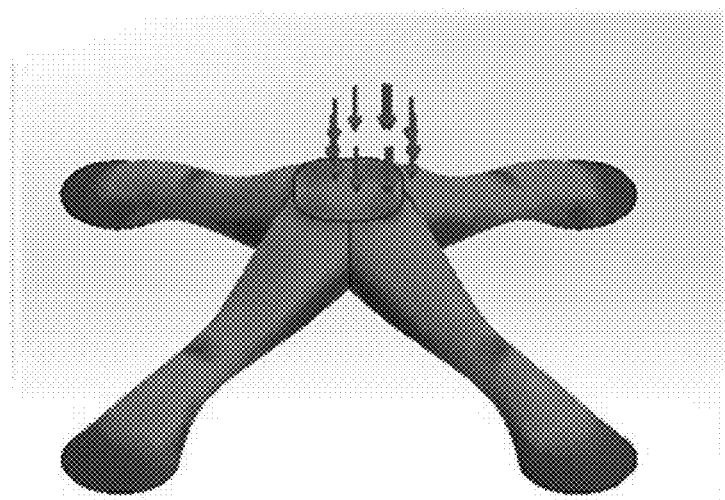
FIG. 14B is a schematic of elastic strain distribution using a truss-like structure with a solid variable area cross section.
Figure 15A:
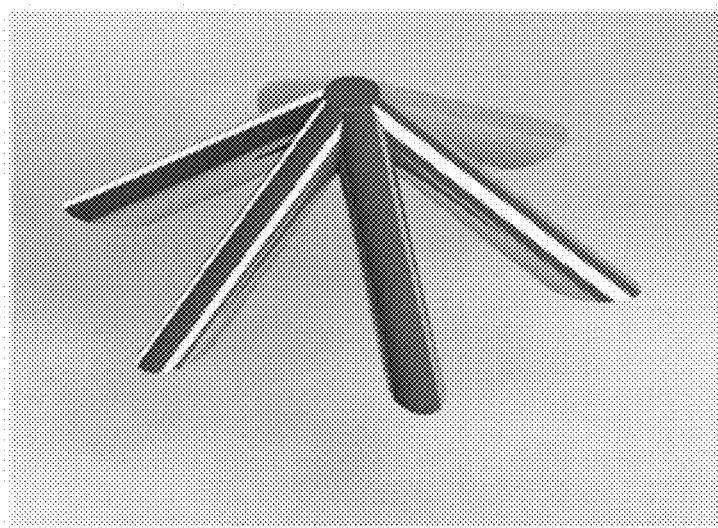
FIG. 15A is a perspective view of a hexagonal symmetric truss-like structure.
Figure 15B:
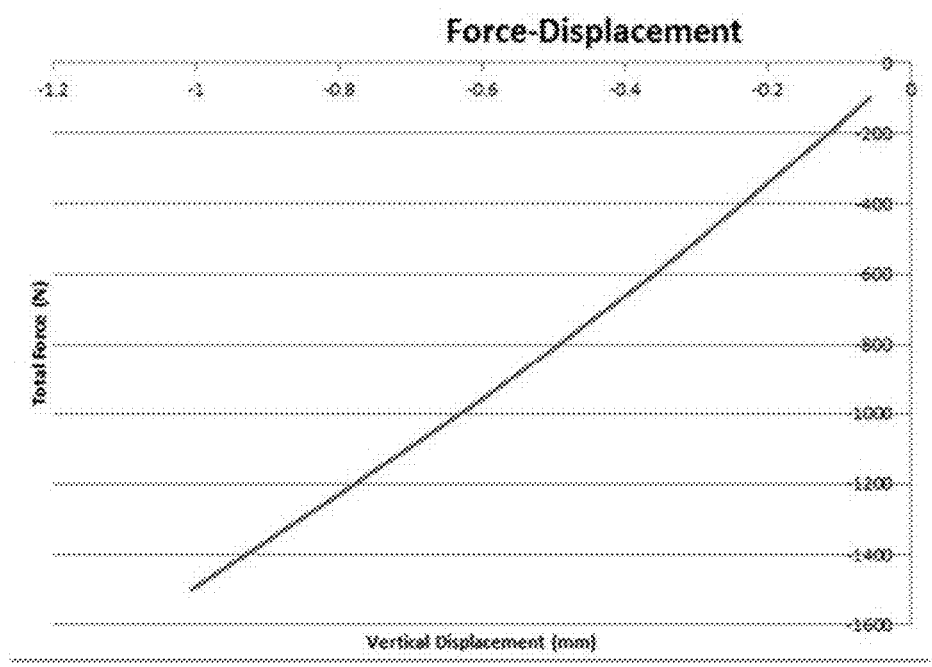
FIG. 15B is a graph of a force-displacement response.
Figure 16A:
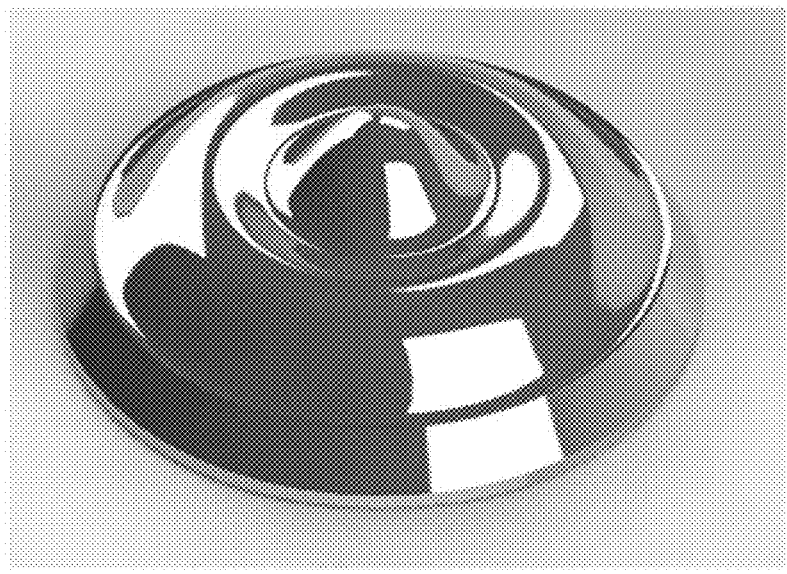
FIG. 16A is a perspective view of a disc-like structure with non-linear support profile.
Figure 16B:
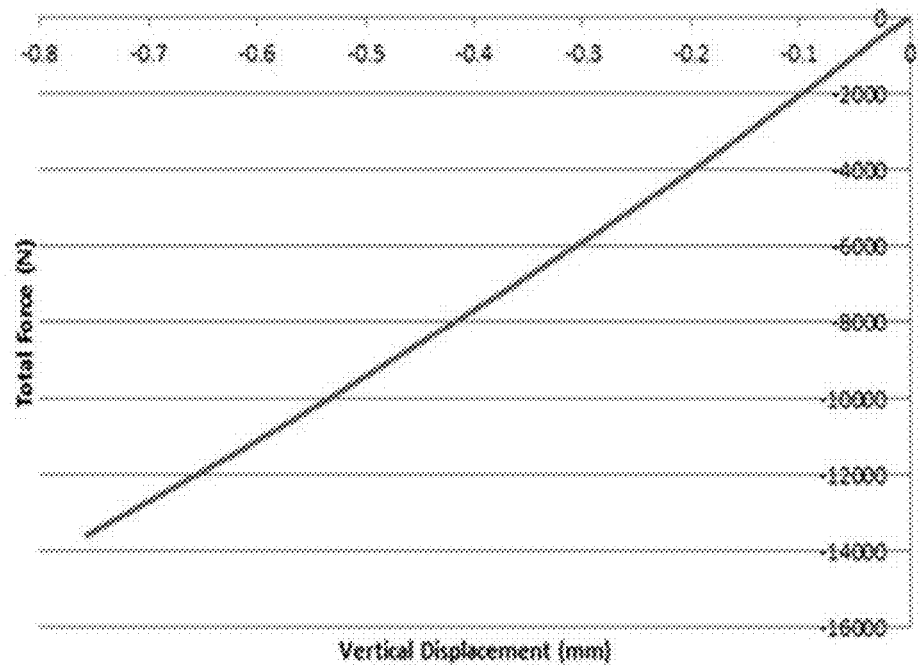
FIG. 16B is a graph of a force-displacement response.
Figure 17A:
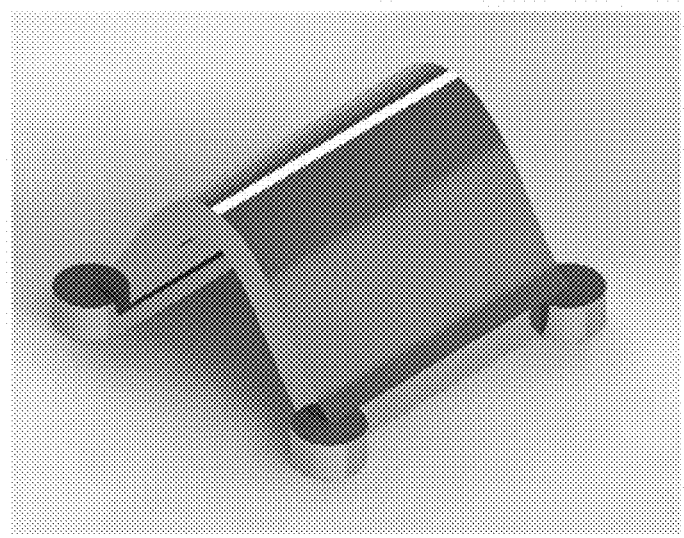
FIG. 17A is a perspective view of a basket-weave structure.
Figure 17B:
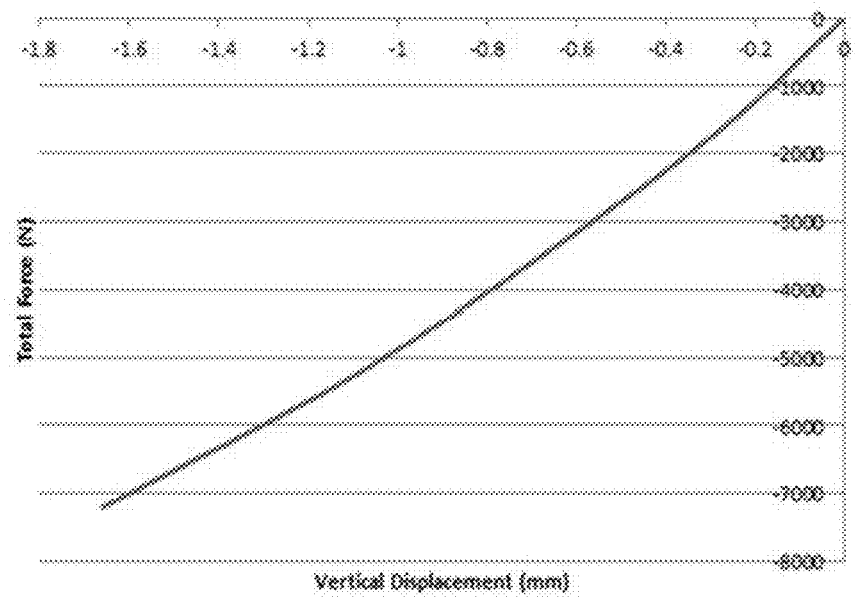
FIG. 17B is a graph of a force-displacement response.
Figure 18A:
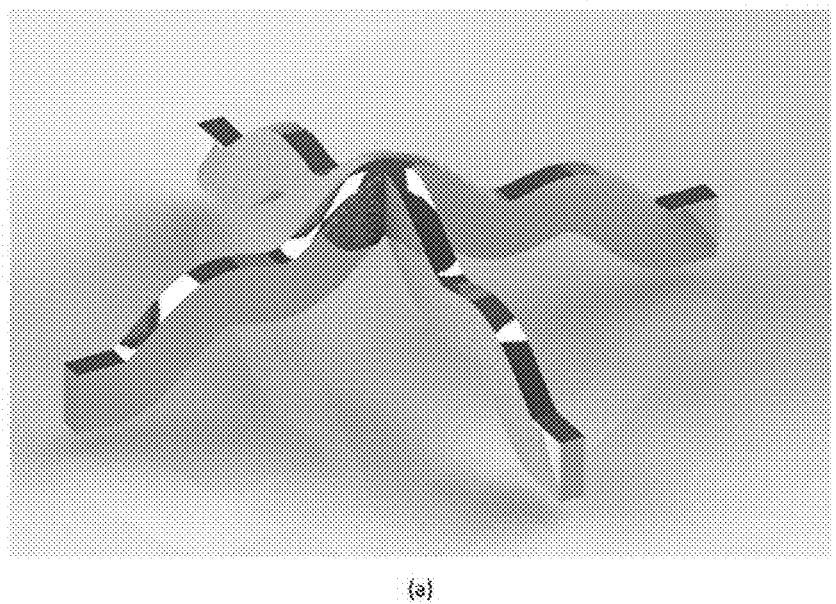
FIG. 18A is a perspective view of a non-linear truss-like structure.
Figure 18B:
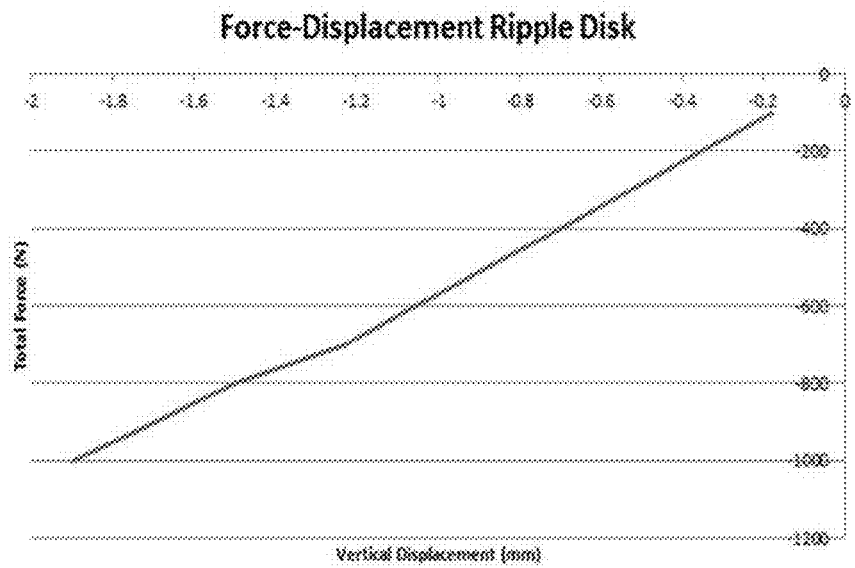
FIG. 18B is a graph of a force-displacement response.

In order to specify a desired shape, one can be guided by application of Finite Element Analysis (FEA). Specific impact loads and specific complex strut geometries or material properties variation can be introduced and evaluated using the FEA model. Iterative trials allow one to evaluate variations in shapes and materials properties that can be engineered to enhance the uniformity of the distribution of strain energy. In the embodiments shown in FIGS. 12A and 13A, the corresponding stress analysis is shown in FIG. 14B, and compared with the equivalent analysis for a straight solid uniform cross section strut design, shown in FIG. 14A. The peak strain region, apparent as the yellow region on the top surface of the strut in FIG. 14A is absent in the variable cross sectional area strut design in FIG. 14B. The region of low strain at the strut mid-length is diminished in volume.

The design shown in FIG. 14B includes a linear variation in strut diameter along its length. The maximum and minimum diameters along the strut differ by a factor of 2, from the largest diameter at both ends of the strut compared to the diameter at the mid-length position. Some examples may employ such non-uniform strut geometries or comparably, non-uniform elastic properties, or non-uniform yield properties, along the strut length. Some of the specific attributes that can be varied to enhance efficiency appear in Table 3.

TABLE 3

| Attributes a that can be modulated within the truss-like structure | |
|---|---|
| Attribute | Typical range of variation |
| Strut diameter | 2x to 5x along length |
| Strut ellipticity ratio | 1.1x to 3x ratio for cross section |
| Strut yield stress | 1.1x to 10x along length or with orientation around a cross section of a strut |
| Anisotropy of elastic properties | Ratio of minimum to maximum stiffness between 0.1 to 0.8 |
| Magnitude of elastic modulus | Acceptable range between 0.5 GPa to 210 GPa |

It should also be noted in FIG. 14B that while introducing a gradient the cross-section area along the struts increases the uniformity of strain state along the length of the strut, there is still a degree of variability around the circumference. Specifically, the magnitude of strain on the lower surface of the struts is lower than on the upward facing surface. This can be seen in FIG. 14A by the variation in color from green on the upward facing surface, indicating a higher strain, to blue at positions approximately 90 degrees from the top surface, indicating a lower strain.

Other embodiments of the non-uniform truss-like structure appear in FIGS. 15 through 18. In these embodiments, the predicted force-displacement response truss-like design is nearly linear, but with widely varying stiffnesses, as shown in the accompanying force-displacement responses predicted by FEA. FIG. 15A is a perspective view of a hexagonal symmetric truss-like structure, and FIG. 15B is a graph of a force-displacement response. FIG. 16A is a perspective view of a disc-like structure with non-linear support profile, and FIG. 16B is a graph of a force-displacement response. FIG. 17A is a perspective view of a basket-weave structure, and FIG. 17B is a graph of a force-displacement response. FIG. 18A is a perspective view of a non-linear truss-like structure, and FIG. 18B is a graph of a force-displacement response.

Figure 19:
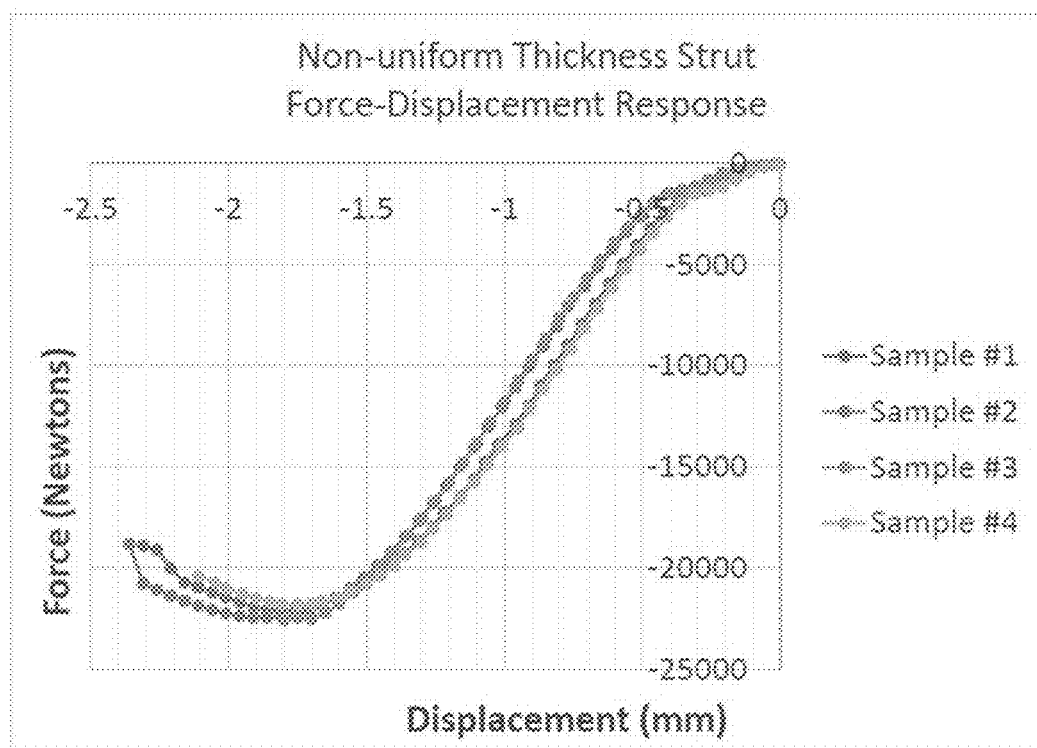
FIG. 19 is a graph of a measured force-displacement response for 5×5 array of lattices with variable thickness struts.

FIG. 19 is a graph showing the measured force-displacement response for a 5 by 5 array of the variable thickness lattice corresponding to the designs shown in FIGS. 12 and 13. FIG. 12B and FIG. 19 can be directly compared. In FIG. 12B, the overall force-displacement response if linear up to a load of 4500 N, and a compressive displacement of 0.4 mm. The measured response appears to be elastically linear, but softer initially up to 0.4 mm, and then slightly stiffer during continued compressive displacement to 1.8 mm. The compressive force for the 5×5 array of variable diameter truss structures is approximately 2300 N after compression by 0.4 mm. The compressive force level continues to climb up to a maximum of 22,500 N at 1.8 mm of compressive displacement. The deflections up to the maximum force are entirely elastic and recoverable. Repeated tests show the reproducibility of force-displacement responses.

The impact response of a 5×5 array of variable thickness trusses of the HMS 5×5 is shown in FIG. 19. A pendulum-style impact test apparatus with an 11.85 pound hammer weight was used to apply a repeatable impact to the HMS truss and multiple commercially available impact mitigation pads. The maximum force transmitted through the HMS lattice alone was 135 N (30.3 lbf). This force level is substantially below the thresholds for tissue damage to virtually all human tissues. It is also substantially less than the forces transmitted through six commercially available impact-mitigation products, designated as Config 3, 2, 9, 5, 8, and 4 in FIG. 20. The range of impact forces transmitted through other materials ranged from 203.9 N to 283.4 N. Thus, the transmitted force through alternative materials is 51% to 110% greater than the force transmitted through the HMS lattice alone. Adding space filling polymeric foam, shear thickening fluid, and a vesicle may further reduce the transmitted force through the integrated HMS system.

Figure 20:
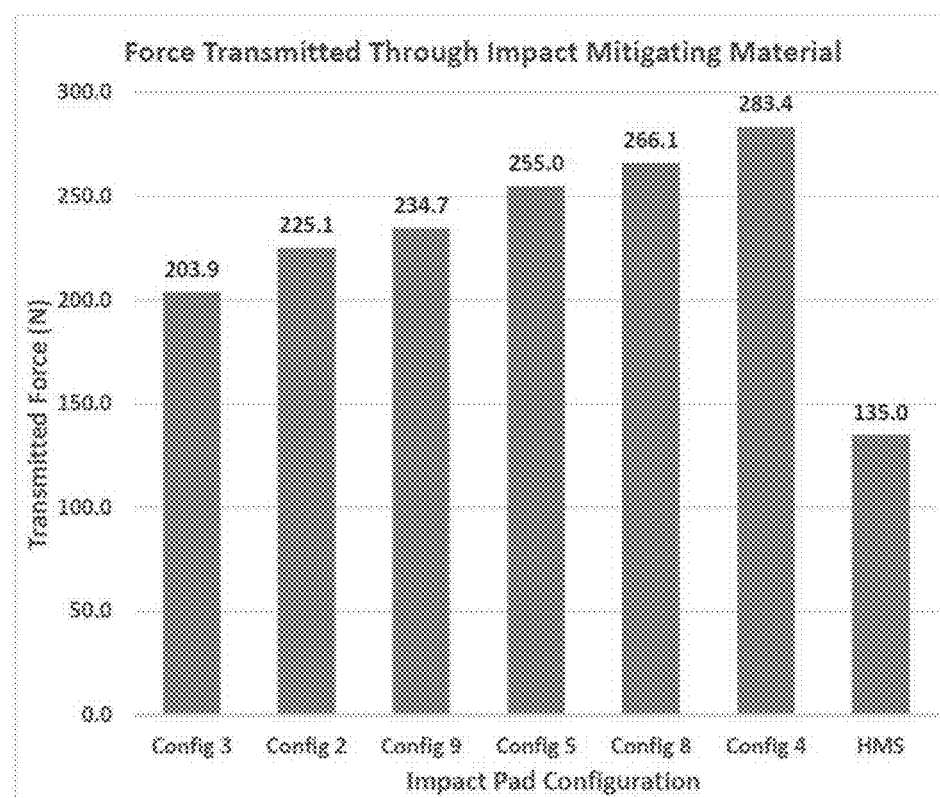
FIG. 20 is a graph of a comparison of maximum transmitted through HMS lattice and six alternative commercially available impact mitigation materials.

FIG. 20 is a graph of a comparison of maximum force transmitted through an HMS lattice and six alternative commercially available impact mitigation materials.

CONCLUSION

In conclusion, the various embodiments of the HMS described herein may be used in a variety of applications to increase the impact mitigation properties of a composite material or assembly. The HMS may integrate the properties of polymeric foams, shear thickening fluids, and metals. The impact response of the combined polymer-metal-fluid system can be tailored to specific applications. In some examples, because of the engineered ability to rapidly and repeatedly absorb high impacts, the hybrid system can be deployed in particularly thin configurations to provide injury in space-limited applications. Applications include, but are not limited to, activities including protecting individuals and objects in professional and amateur sports, packaging, transportation, military or police functions, activewear, dance clothing, competition sports clothing, automobile interiors, and childcare.

It should be noted that any of the features in the various examples and embodiments provided herein may be interchangeable and/or replaceable with any other example or embodiment. As such, the discussion of any component or element with respect to a particular example or embodiment is meant as illustrative only.

It should be noted that although the various examples discussed herein have been discussed with respect to composite materials, the devices and techniques may be applied in a variety of applications, such as, but not limited to apparel for sports and fitness activities, packaging, uniforms for military or police personnel, various aspects of high risk environments, uniforms for industrial workers, active wear apparel, transportation systems, etc.

All directional references (e.g., upper, lower, upward, downward, left, right, leftward, rightward, top, bottom, above, below, vertical, horizontal, clockwise, and counter-clockwise) are only used for identification purposes to aid the reader's understanding of the examples of embodiments and do not create limitations, particularly as to the position, orientation, or use of the embodiments unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the embodiments are not limited to components which terminate immediately beyond their point of connection with other parts. Thus the term "end" should be broadly interpreted, in a manner that includes areas adjacent rearward, forward of or otherwise near the terminus of a particular element, link, component, part, member or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the broad understanding of the embodiments as defined in the appended claims.

The invention claimed is:

1. An apparatus for impact mitigation comprising:
   a vesicle;
   a space filling porous or fibrous structure that fills the vesicle;
   a shear thickening fluid within the space filing porous or fibrous structure; and
   a truss structure housed in the space filling porous or fibrous structure and formed of a plurality of sub-trusses, each of the plurality of sub-trusses having a plurality of non-uniform struts, each strut having a length extending between a first end and a second end in a generally linear direction and a cross-section normal to the length, wherein the first ends of the non-uniform struts are coupled together to form a sub-truss of the plurality of sub-trusses and the second ends of the non-uniform struts are positioned upon a generally planar surface defining an angle between the length of each of the non-uniform struts and the surface between about 20 and 55 degrees, wherein the plurality of sub-trusses are coupled together at the second ends of the non-uniform struts to form the truss structure.

2. The apparatus of claim 1, wherein the cross-section of each of the non-uniform struts varies along the length.

3. The apparatus of claim 2, wherein an elastic limit of each of the non-uniform struts varies along the length.

4. The apparatus of claim 1, wherein a shape of the struts of the truss structure varies along the length of each strut.

5. The apparatus of claim 1, wherein the configuration of the struts to form the truss structure forms a three-fold symmetry in the plane of the truss.

6. The apparatus of claim 1, wherein a width of each of the struts matches a dimension of a periodic array of struts in one direction.

7. The apparatus of claim 1, wherein the vesicle of the apparatus is constructed of a woven fiber.

8. The apparatus of claim 1, wherein the apparatus is contained within a package.

9. The apparatus of claim 1, wherein the space filling porous or fibrous structure is a woven textile.

10. The apparatus of claim 1, wherein the vesicle of the apparatus is constructed of a polyurethane material.

11. The apparatus of claim 1, wherein four non-uniform struts are coupled together at the first end to form a sub-truss of the plurality of sub-trusses.

12. The apparatus of claim 1, wherein five non-uniform struts are coupled together at the first end to form a sub-truss of the plurality of sub-trusses.

13. The apparatus of claim 1, wherein six non-uniform struts are coupled together at the first end to form a sub-truss of the plurality of sub-trusses.

14. The apparatus of claim 1, wherein the truss structure is formed of thermosetting plastic.

15. The apparatus of claim 1, wherein each of the plurality of sub-trusses comprises three or more non-uniform struts.

16. An apparatus for impact mitigation comprising:
a vesicle;
a space filling porous or fibrous structure;
a shear thickening fluid; and
a truss structure having three, four, or five non-uniform struts, each strut having a first end, a second end, and a length, defining a variable cross-section normal to the length, wherein the struts define a shape that varies along its length such that the cross-section at the first and/or second end of the truss is larger than the cross-section at or near the middle of the truss to aid in increasing total strain energy accommodated during and after an impact event, and the struts are coupled together at the first end to form a sub-truss for accepting an applied force, the second ends positioned upon a generally planar surface defining an angle between the strut and the surface between about 20 and 55 degrees, wherein an elastic limit of each of the non-uniform struts varies along the length and the struts distribute strain energy non-uniformly during an impact event.

17. The apparatus of claim 16, wherein the cross section has a diameter that is between 35% and 20% of the truss height, which is between 3 mm and 15 mm.

18. A method of dispersing energy from an impact, the method comprising:
placing an apparatus for impact mitigation at or near an impact site, the apparatus comprising a vesicle, a space filing or fibrous structure that fills the vesicle, a shear thickening fluid within the space filing porous of fibrous structure and a truss structure housed in the space filling porous or fibrous structure and having a plurality of sub-trusses, each of the plurality of sub-trusses having a plurality of non-uniform struts, each strut having a length extending between a first end and a second end of the strut in a generally linear direction, wherein the first ends of the non-uniform struts are coupled together to form a sub-truss of the plurality of sub-trusses, wherein the second ends of the plurality of non-uniform struts are positioned upon a generally planar surface defining an angle between the lengths of the plurality of non-uniform struts and the surface between about 20 and 55 degrees, wherein the plurality of sub-trusses are coupled together at the second ends of the non-uniform struts to form the truss structure;
contacting the truss with an object or body;
compressing the truss along a first direction;
allowing the truss to deform in response to the impact; and thereby
dispersing energy from the impact.

19. An apparatus for impact mitigation comprising:
a vesicle;
a space filling porous or fibrous structure;
a shear thickening fluid; and
a truss structure formed of a plurality of sub-trusses, each of the plurality of sub-trusses having a plurality of non-uniform struts, each strut having a length extending between a first end and a second end in a generally linear direction and a cross-section normal to the length, wherein the first ends of the non-uniform struts are coupled together to form a sub-truss of the plurality of sub-trusses and the second ends of the non-uniform struts are positioned upon a generally planar surface defining an angle between the length of each of the non-uniform struts and the surface between about 20 and 55 degrees, wherein the plurality of sub-trusses are coupled together at the second ends of the non-uniform struts to form the truss structure,
wherein the configuration of the struts to form the truss structure forms a three-fold symmetry in the plane of the truss.

20. An apparatus for impact mitigation comprising:
a vesicle;
a space filling porous or fibrous structure;
a shear thickening fluid; and
a truss structure formed of a plurality of sub-trusses, each of the plurality of sub-trusses having a plurality of non-uniform struts, each strut having a length extending between a first end and a second end in a generally linear direction and a cross-section normal to the length, wherein the first ends of the non-uniform struts are coupled together to form a sub-truss of the plurality of sub-trusses and the second ends of the non-uniform struts are positioned upon a generally planar surface defining an angle between the length of each of the non-uniform struts and the surface between about 20 and 55 degrees, wherein the plurality of sub-trusses are coupled together at the second ends of the non-uniform struts to form the truss structure,
wherein four non-uniform struts are coupled together at the first end to form a sub-truss of the plurality of sub-trusses.

* * * * *